May 3, 1927.
G. A. CLEMENT
1,627,148
MARKING FUSED BIFOCAL LENSES FOR IDENTIFICATION
Filed Aug. 13. 1925
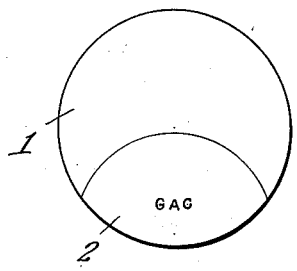
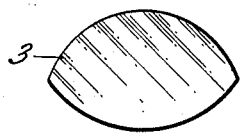
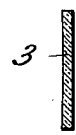
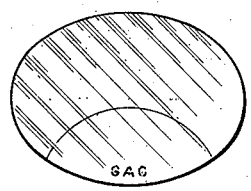
INVENTOR.
George G. Clement
BY
Stockbridge & Borst
ATTORNEYS Patented May 3, 1927.

1,627,148

UNITED STATES PATENT OFFICE.

GEORGE A. CLEMENT, OF MOUNT VERNON, NEW YORK.

MARKING FUSED BIFOCAL LENSES FOR IDENTIFICATION.

Application filed August 13, 1925. Serial No. 50,085.

The desirability of being able to determine the origin of ophthalmic lens blanks even after the blanks have been finished into lenses is well appreciated in the trade. Identifying marks as commonly used on the blanks will be ground off during the conversion of the blank into a finished lens, and it not uncommonly happens that defects are not discovered until after the grinding has been partly or wholly done. Occasions for disputes with manufacturers of lens blanks as to the origin of defective lenses returned for credit, will be eliminated if the identifying marks are of such a character or are so disposed that they are not eradicated by the grinding and polishing operations.

My invention has to do especially with the identification of fused bifocal lenses and blanks therefor, and its object primarily is to provide a mark for such lenses and blanks which remains in the finished lens and yet is not visible to the ordinary observer and does not interfere with the refractive or translucent character of the lens. Another object is facility and inexpensiveness in introducing the identifying marks. Other general objects, such as permanency of the mark, freedom from interference with the vision of the wearer, and facility in recognition and identification will appear from the following particular description.

Fused bifocal lens blanks are made by fusing a small glass segment of one index of refraction on to a large glass blank of another index of refraction. Ordinarily the major lens blank is crown glass and the minor lens blank or segment is flint glass. A seat for the segment is formed on the major blank, either by grinding and polishing a segmental area extending from the edge to near the center of one face of the molded blank, or the seat may be molded on the blank, and one face of the segment is similarly prepared for fusing on the seat. The two elements are then placed in an oven with the prepared surfaces adjacent and there subjected to heat until fused together. The bifocal face of the blank is subsequently ground and finished down to a continuous unbroken spherical surface including a portion of the flint segment, which segmental area constitutes the reading field due to the higher refractivity of the flint glass. The contact or fusion surface is thus internal of the finished lens.

In accordance with my invention I cause an identifying mark to be made in this fusion surface, for example, either by molding or scratching it on the contact surface of one of the lens elements prior to fusing them. My usual practice is to scratch the mark lightly on the finished surface of the seat on the crown glass blank. I prefer to put it on the major blank since the crown glass has the higher fusing point and the mark is therefore less liable to be obliterated by the fusing. A minute symbol or mark scratched in the highly polished surface will be readily apparent under a magnifying glass, but will not be noticeable either to the wearer of the lenses or to another and will not appreciably interfere with the refraction of the light passing through that portion of the lens. Preferably the mark is disposed substantially to one side of the usual line of vision through the reading portion of the finished lens.

In the drawings I have shown my invention applied to a fused bifocal lens blank. Figs. 1 and 2 are, respectively, a central section and a plan of a major lens blank.

Figs. 3 and 4 are similar views of a button or segment.

Fig. 5 is a central section of the fused blank.

Fig. 6 is a plan of the finished lens made from the blank.

The major lens blank 1 is shown of periscopic form and is commonly made by dropping or molding. This blank is composed of crown glass and has on its convex face a segmental seat 2 which is usually prepared by grinding and polishing this portion of the surface of the molded blank. The curvature of this seat 2 depends upon the added strength which is desired through the reading portion of the finished lens. It is shown as a convex spherical or plus curve but of longer radius than the curve of the molded surface. On this seat 2 is scratched the identifying mark, in this case shown as the letters GAC. They are shown as located near the lower edge of the segmental seat, being therefore considerably below the optical axis and the usual center of vision through the reading portion of the finished lens. For this reason the letters will very rarely come within the line of vision of the wearer of the lens, but the letters are moreover so small and so lightly scratched that they are unobservable to the wearer even when they come within his line of vision.

The segment or button 3 of flint glass has one face ground and polished to the proper curvature, and is then fused upon the seat 2, making the blank as shown in Fig. 5. The bifocal side of the blank will then be ground down, for example, to the curve indicated by the dotted line in Fig. 5, so as to make a continuous surface including a portion of the flint glass segment. The letters scratched in the seat 2 are therefore covered by the flint glass. Finally the opposite side of the blank is ground according to the prescription and the finished lens is cut and edged to the desired shape, for example, as shown in Fig. 6. It will be observed that this brings the identifying letters very close to the lower edge of the segment. It is obvious that the mark may be located elsewhere on the contact surface, for example, near one corner of the segment which very seldom comes in the line of vision.

It is also obvious that the mark may be of a different character than that indicated and may be otherwise formed in one of the contact surfaces, and that the embodiment of my invention as illustrated and above described may be otherwise modified without departing from the principle and scope of my invention as pointed out in the appended claims.

I claim:

1. A fused bifocal lens or blank therefor having an identifying mark formed on the contact surface of one of the fused lens elements.

2. The method of marking fused bifocal lens blanks for the purpose of identification consisting in finishing a portion of one face of a major lens to a given curve as a seat for a minor lens and finishing one face of a minor lens for fusing on said seat, making an identifying mark on one of the finished surfaces, and then placing the two surfaces together and subjecting them to heat until fused.

3. The method of marking fused bifocal lens blanks for the purpose of identification consisting in preparing a seat on a lens of glass of relatively high fusing point, making an identifying mark in the surface of said seat, and then fusing on said seat another lens of lower fusing point.

4. A lens formed of a piece of glass having a depression in one surface thereof and constituting a major lens blank, and another piece of glass filling and fused in said depression in the major lens blank, the adjacent surface of one of said pieces of glass having a distinguishing mark in it between the two pieces of glass fused together.

5. A lens formed of a major lens blank having a depression in one surface thereof, and another piece of glass filling and fused in said depression of the major lens blank, the depressed portion of said major lens blank having a distinguishing mark in it between the two pieces of glass fused together.

6. The process of making a lens, which process consists in grinding and polishing a depression in a piece of glass to form a major lens blank, forming another piece of glass to fit in said depression, making a distinguishing mark in the adjacent surface of one of said pieces of glass, fusing the two pieces of glass together, and thereafter grinding and polishing the lens.

7. The process of marking a lens, which process consists in grinding and polishing a depression in a major lens blank, marking the surface of the depression as desired, filling said depression with other glass, fusing the same with said major blank, and thereafter grinding and polishing the lens.

In witness whereof, I hereunto subscribe my signature.

GEORGE A. CLEMENT.